(12) United States Patent
James, Jr. et al.

(10) Patent No.: US 6,363,492 B1
(45) Date of Patent: Mar. 26, 2002

(54) COMPUTER METHOD AND APPARATUS TO FORCE BOOT BLOCK RECOVERY

(75) Inventors: Don R. James, Jr.; Randall L. Hess, both of Cypress; Jeffrey D. Kane, Spring, all of TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

(21) Appl. No.: 09/071,127

(22) Filed: Apr. 30, 1998

(51) Int. Cl.$^7$ .................................................. G06F 11/00

(52) U.S. Cl. ............................................. 714/1; 713/2

(58) Field of Search ............................. 714/1, 2, 5, 7, 714/15, 6; 711/103, 170, 173; 713/1, 2; 709/222, 220

(56) References Cited

U.S. PATENT DOCUMENTS

| | | | |
|---|---|---|---|
| 3,890,601 A | 6/1975 | Pietrolewicz | 340/172.5 |
| 4,942,606 A | 7/1990 | Kaiser et al. | 380/4 |
| 4,959,860 A | 9/1990 | Watters et al. | 380/4 |

(List continued on next page.)

OTHER PUBLICATIONS

Intel Corp., *Intel 486 SL Microprocessor SuperSet Programmer's Reference Manual*, Nov. 1992, pp. 6–28—6–53.
Philips Semiconductors, I$^2$C Spec. Information—The I$^2$C Bus and how to use it (including specifications), 1993.
Intel Corp., System Management Bus Specification, Apr. 21, 1994 (Rev. 0.95).
Cates, Ron, et al., Charge NiCd and NiMH Batteries Properly, Electronic Design, Jun. 10, 1996, pp. 118, 120, 122.
EET Special Edition. Part 2: Batteries—Power Technologies, Elec. Eng. Times, Apr. 8, 1996, pp. 39–82.
Intel Corp., , chapter 20 System management Mode, pp. 20–1–20–9, 1994.
Compaq Computer Corporation, Phoenix Technologies Ltd., and Intel Corporation, Preliminary Plug and Play BIOS Specification, Version 1.0A. p. 7–64, Mar. 10, 1994.
Microchip Data Sheet Manual, PIC16C5X EPROM/ROM–Based 8–Bit CMOS Microcontroller Series (1995–1996).
Siemens Components, Inc., Advertisement for SAB88C166 with on–board flash EPROM (Sep. 1996).
Dipert, Brian, et al. *Designing with Flash Memory*, Copyright Annabooks 1993, San Diego, CA, pp. 1–84.
Messmer, Hans–Peter. *The Indispensable PC Hardware Book*, Addison–Wesley Publishing Company, Inc., 2nd edition Copyright 1995, pp. 709–713.
Curtis E. Stevens, et al. *ATAPI Removable Media Device BIOS Specification* Version 1.0, Jan. 30, 1997, pp. 1–18.
Compaq Computer Corporation *Reference Guide Compaq Deskpro/M*. Chapter 5 pp. 5–1—5–13.
Western Digital, *Enhanced IDE 95/96 Guide*, Version 0.95, Mar. 17, 1995.
Advanced Micro Devices (AMD), Am29F002T/Am29F002B 2 Megabit (262,144 x 8–bit) CMOS 5.0 Volt–only, Sector Architecture Flash Memory, Dec. 1996, Publication No. 20818, (Rev. B).

(List continued on next page.)

Primary Examiner—James P. Trammell
Assistant Examiner—Pierre Eddy Elisca
(74) Attorney, Agent, or Firm—Akin, Gump, Strauss, Hauer & Feld, LLP

(57) ABSTRACT

An apparatus and method to force the computer system to boot from the boot block. During a computer system power-up and initialization, the computer system determines if the escape key is pressed. If so, the computer system will boot from the code in the boot block, proceeding as if the flash ROM is corrupted. This forces the computer system to boot from the boot block even though the system determines that the flash ROM is not corrupt, allowing the user to flash a ROM at the user's discretion.

33 Claims, 6 Drawing Sheets

OTHER PUBLICATIONS

| | | | |
|---|---|---|---|
| 5,150,407 A | 9/1992 | Chan | 380/4 |
| 5,325,532 A | 6/1994 | Crosswy et al. | 395/700 |
| 5,327,531 A | 7/1994 | Bealkowski et al. | 395/164 |
| 5,375,243 A | 12/1994 | Parzych et al. | 395/725 |
| 5,377,343 A | 12/1994 | Yaezawa | 395/425 |
| 5,388,267 A | 2/1995 | Chan et al. | 395/700 |
| 5,544,356 A | 8/1996 | Robinson et al. | 395/600 |
| 5,557,783 A | 9/1996 | Oktay et al. | 395/550 |
| 5,603,055 A | 2/1997 | Evoy et al. | 395/652 |
| 5,870,520 A * | 2/1999 | Lee et al. | 714/6 |
| 5,889,987 A * | 3/1999 | Nelson et al. | 713/2 |
| 5,937,434 A * | 8/1999 | Hasbun et al. | 711/173 |
| 5,944,820 A * | 8/1999 | Beelitz | 713/1 |
| 5,951,685 A * | 9/1999 | Stancil | 713/2 |
| 5,951,686 A * | 9/1999 | McLaughlin et al. | 713/2 |
| 5,960,445 A * | 9/1999 | Tamori et al. | 713/2 |
| 5,964,873 A * | 10/1999 | Choi | 713/2 |
| 5,974,528 A * | 10/1999 | Tsai et al. | 712/37 |
| 5,987,605 A * | 11/1999 | Hill et al. | 713/2 |
| 5,991,875 A * | 11/1999 | Paul | 713/2 |

OTHER PUBLICATIONS

Intel Corporation, DK440LX Motherboard Jumper Settings. Http://Developer.intel.com/design/motherbd/dk/DK_CONFG.HTM.

Intel Corporation, CN430TX Motherboard Jumper Settings. Http://Developer.intel.com/design/motherbd/cn/CN_confg.htm.

National Semiconductor, PC87307VUL Super I/O Enhanced Sidewinder Lite Plug and Play Compatible Chip, with a Floppy Disk Controller, a Keyboard Controller, a Real Time Clock, Two Fast UARTs, Infrared Support and an IEEE1284 Parallel Port, Feb. 1997.

* cited by examiner

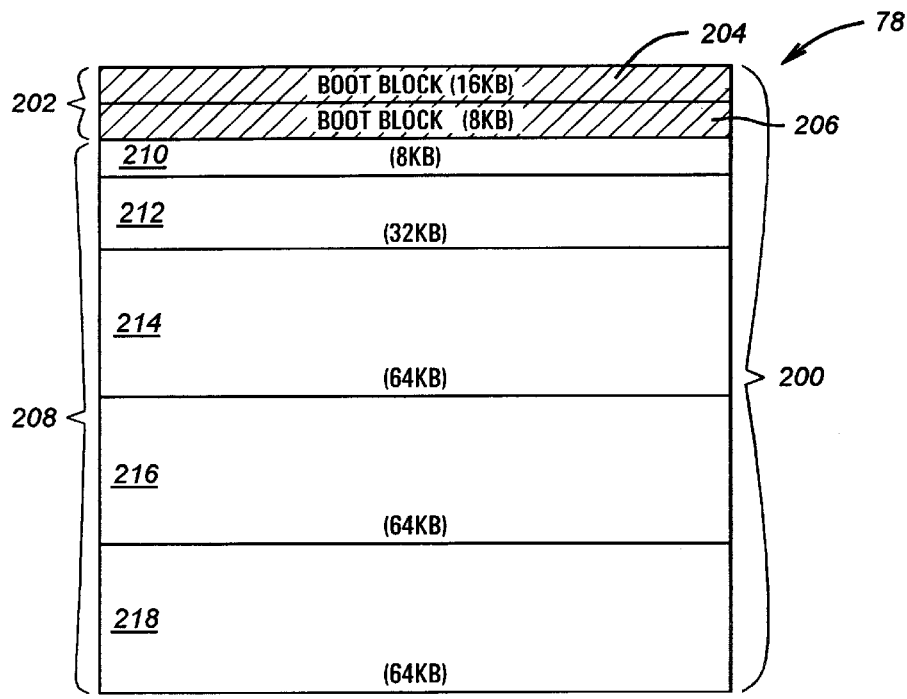
FIG. 2
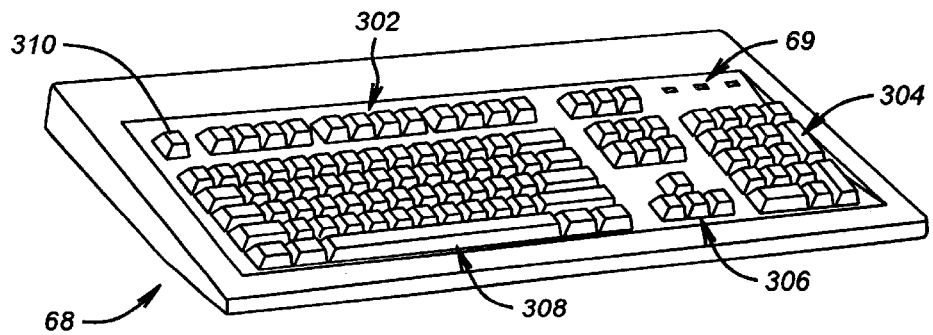
FIG. 3
| | CAPS LOCK | NUM LOCK | SCROLL LOCK | MEANING |
|---|---|---|---|---|
| 402 | ON | OFF | OFF | ADMIN PASSWORD REQUIRED. REMAINS LIT UNTIL A VALID ADMIN PASSWORD IS ENTERED. |
| 404 | OFF | ON | OFF | BOOT FAILED (DISKETTE NOT PRESENT, DRIVE NOT READY, ETC). SYSTEM MUST BE RESET TO RETRY BOOT. |
| 406 | OFF | OFF | ON | FLASH FAILED (SET BY ROMPAQ) |
| 408 | ON | ON | ON | FLASH COMPLETE (SET BY ROMPAQ) |
FIG. 5

COMPUTER METHOD AND APPARATUS TO FORCE BOOT BLOCK RECOVERY

BACKGROUND OF THE INVENTION

1. Field of the Invention

The present invention relates to flashing an image in a non-volatile memory, and more specifically to forcing the system into a boot block recovery mode even when the non-volatile memory is not corrupt.

2. Description of the Related Art

The pursuit of low maintenance computers has been a defining issue among personal computer manufacturers for many years. The satisfaction of a personal computer (PC) user is related to the reliability of the PC and to the ease of the troubleshooting/correction procedures. PC's that require a low level of maintenance or eliminate troubleshooting and repair by outside technicians have advantages over maintenance intensive PC's. An error which often exceeds the average user's skill level is when the PC's system programmable Read Only Memory (ROM) becomes corrupt.

Historically ROM, which is non-volatile, was not in-system updatable. ROM memories store code and data required to initialize and operate a system. However, as system enhancement and upgrades became common, the desirability of an updatable ROM increased. A need for an updatable ROM was met by the creation of the Electrically-Erasable-Programmable-Read-Only-Memory (EEPROM). The EEPROM is in-system writable and non-volatile. The EEPROM, by means of an electric pulse, can be programmed and erased. A more recent innovation in the memory technology field is flash ROM. Flash ROM is inherently non-volatile and allows for in-system updateability. Flash ROM can be updated by "flashing" a new ROM image on to the chip, while the system is operational, from a variety of possible sources, including removable media devices, modem links, or parallel or serial connectors.

Flash ROMs are frequently used to store embedded code in the PC. A PC system ROM traditionally contains the resident code that runs the system. A Basic Input/Output System (BIOS) is a typical embedded code storage application of the PC. The BIOS is low level code interfacing the operating system to the specific hardware implementation. Typical BIOS functions include the initialization of disk drives, including floppy, hard, and compact, and initialization of the video and graphical interfaces. The BIOS is specifically configured for each PC based on the presence of specific hardware and the current version or manufacturer of the hardware. If the PC hardware is updated or modified, the BIOS may need to be upgraded to properly initialize the new hardware. An updated BIOS can be flashed, by the user, to the flash ROM, after the user has replaced or upgraded a component to the PC.

A potential problem exists when an updated BIOS is flashed. An incorrect BIOS could inadvertently be flashed or the flash could be interrupted resulting in a corrupted ROM. If this occurs, the system would not initialize. To prevent this, the flash ROM memory array is divided into two distinct sections, the boot block and the main block. The previously discussed applications have all resided in the main block of the flash ROM. The boot block of the flash ROM is protected from an ordinary flash, and that data will remain even after a corrupted flash ROM image is flashed.

The boot block can thus be used to store kernel code necessary to initialize the basic components of the system if a corrupted ROM image is present. This may be no more than code sufficient to allow the corrupted ROM to be re-flashed. Typically, the boot block code cannot be altered by standard ROM power levels, such as 3–5 volts, the levels necessary to perform an in-system ROM flash. Instead, the boot block code is usually programmed by using higher voltage levels, such as 12 volts. Therefore even if the ROM is incorrectly flashed because of the code present in the boot block, the system will still initialize enough to allow the user to flash the correct ROM image to the flash ROM, using the techniques discussed above. The boot block traditionally contains the initialization routines for a floppy disk and a keyboard, but no video interface.

Typically, to determine if a flash ROM is corrupt, the computer system verifies the validity of the flash ROM by using a checksum. A checksum is typically calculated by adding all the bytes in the flash ROM; this value should equal a predetermined amount, the checksum amount. If the value does not equal the checksum amount, then the computer system determines that the flash ROM is corrupt and proceeds to execute the boot block code. If the value equals the checksum amount, the computer system determines the flash ROM is not corrupt, and executes the system block code.

A potential problem exists if a corrupt flash ROM's checksum value does equal the checksum amount by chance, if a virus infected image has previously been loaded into the flash ROM, or if it is otherwise desired or necessary to re-flash the ROM without a normal system boot. In these cases, the computer proceeds with a regular boot even though the flash ROM is corrupt. Techniques that enhance the flexibility of re-flashing a ROM would be desirable.

With the increase in distributed networks and the abilities of PCs to link to each other and to link to various networks, improvements in PC security is desirable. Historically, a PC could be "secured" by physical isolation. Today's networked environment, however, makes such total isolation impractical. Therefore, techniques that enhance security of PCs would also be desirable.

SUMMARY OF THE INVENTION

A method, apparatus, and computer system according to the invention that forces the computer system into boot block recovery even if there is no internal indication that a re-flash is necessary. The apparatus or computer system determines, during power-up, if an input device has been initialized. If the input device has been initialized, the computer system monitors the input device to see if an input is entered. If an input is entered within a predetermined period, the computer system compares the input to a predetermined recovery input. If the input matches the predetermined recovery input, then the computer system executes the code contained in the boot block rather than the other portion of the flash.

BRIEF DESCRIPTION OF THE DRAWINGS

A better understanding of the present invention can be obtained when the following detailed description of the preferred embodiment is considered in conjunction with the following drawings, in which:

FIG. 2 is a block diagram of the section partitioning of a flash ROM of FIG. 1.

FIG. 3 is a diagram of a standard keyboard of FIG. 1.

FIG. 5 is a table of a predefined prompt set according to the present invention.

DETAILED DESCRIPTION OF THE PREFERRED EMBODIMENT

The following disclosures are hereby incorporated by reference:

U.S. application Ser. No. 09/070,936, entitled "A COMPUTER METHOD AND APPARATUS TO PROMPT FOR ADMINISTRATIVE PASSWORD TO FLASH A CORRUPTED NON-VOLATILE MEMORY," by Don R. James, Jr., Randall L. Hess, and Jeffrey D. Kane, filed concurrently herewith;

U.S. application Ser. No. 09/070,821, entitled "BOOT BLOCK SUPPORT FOR ATAPI REMOVABLE MEDIA DEVICES," by Paul J. Broyles and Don R. James, Jr., filed concurrently herewith;

U.S. application Ser. No. 09/070,457, entitled "SECURITY METHODOLOGY FOR DEVICES HAVING PLUG AND PLAY CAPABILITIES," by Christopher E. Simonich and Robin T. Tran, filed concurrently herewith;

U.S. application Ser. No. 09/070,942, entitled "METHOD AND APPARATUS FOR REMOTE ROM FLASHING AND SECURITY MANAGEMENT FOR A COMPUTER SYSTEM," by Manual Novia Wayne P. Sharum; Paul H. McGahn and Paul B. Hokanson; Adrien Chrisan filed concurrently herewith;

U.S. application Ser. No. 09/070,866, entitled "A METHOD FOR FLASHING ESCD AND VARIABLES INTO A ROM," by Mark A. Piwonka, Louis S. Hobson, Geffrey D. Kane and Randall L. Hess, filed concurrently herewith;

U.S. application Ser. No. 08/684,413, entitled "FLASH ROM PROGRAMMING," by Patrick R. Cooper, David J. Delisle, and Hung Q. Le filed Jul. 19, 1996; and U.S. application Ser. No. 09/071,128, entitled "A UNIFIED PASSWORD PROMPT OF A COMPUTER SYSTEM," by Michael D. Garrett, Randall L. Hess; Chi W. So, and Mohammed Anwarmariz, filed concurrently herewith; all of which are assigned to the assignee of this invention.

Figure 1:
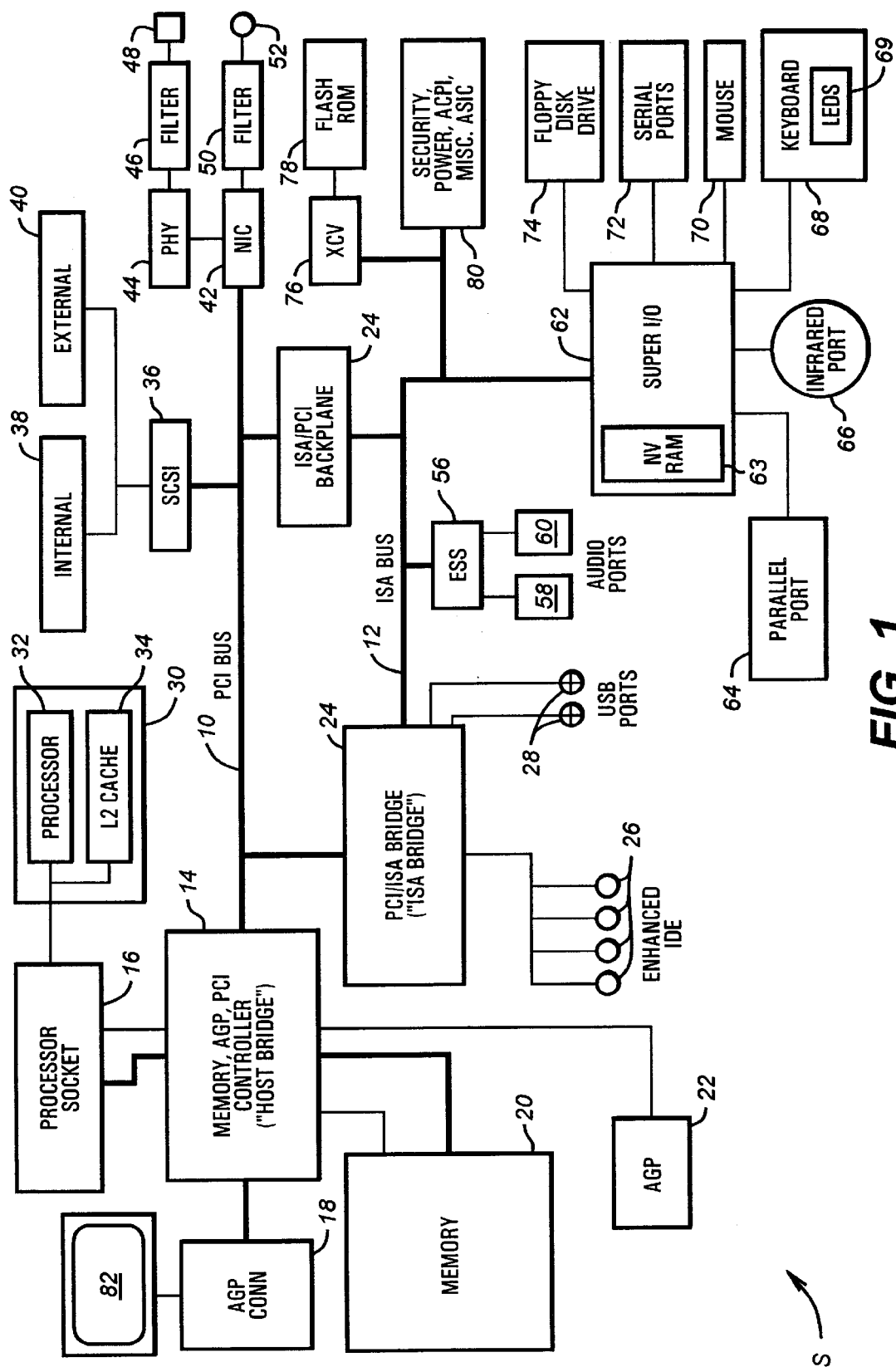
FIG. 1 is a block diagram of the computer system having a flash ROM according to the present invention.
Figure 4A:
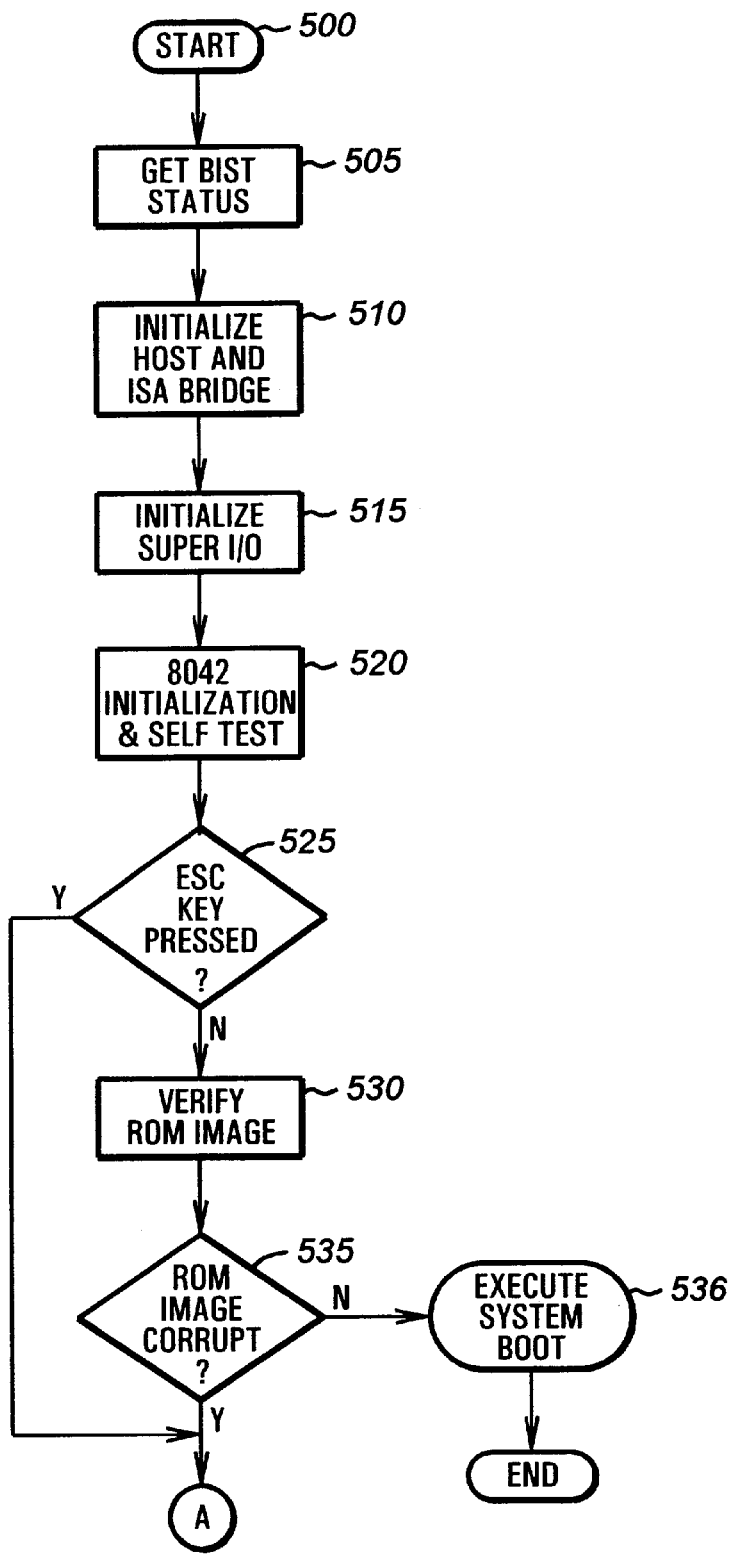
FIGS. 4A–4D is a flow chart of boot block code resident in the flash ROM of FIG. 1.
Figure 4B:
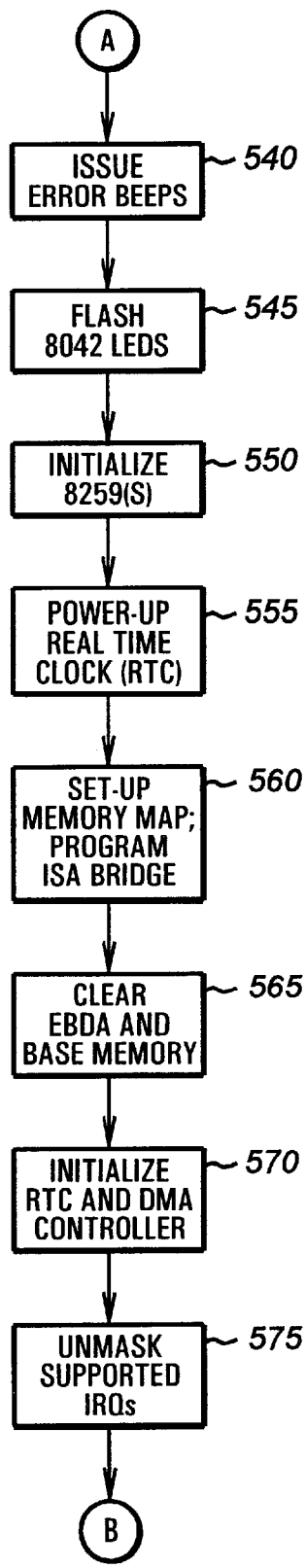
Figure 4C:
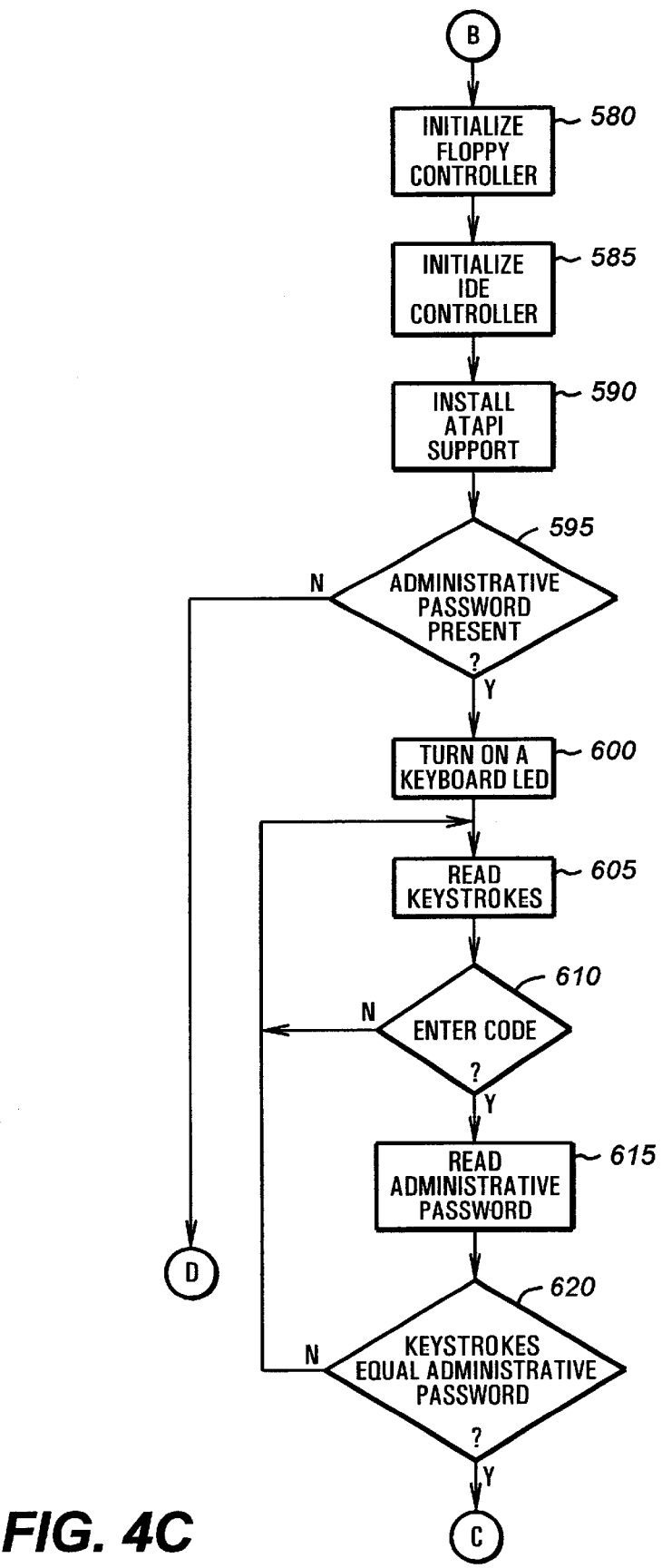
Figure 4D:
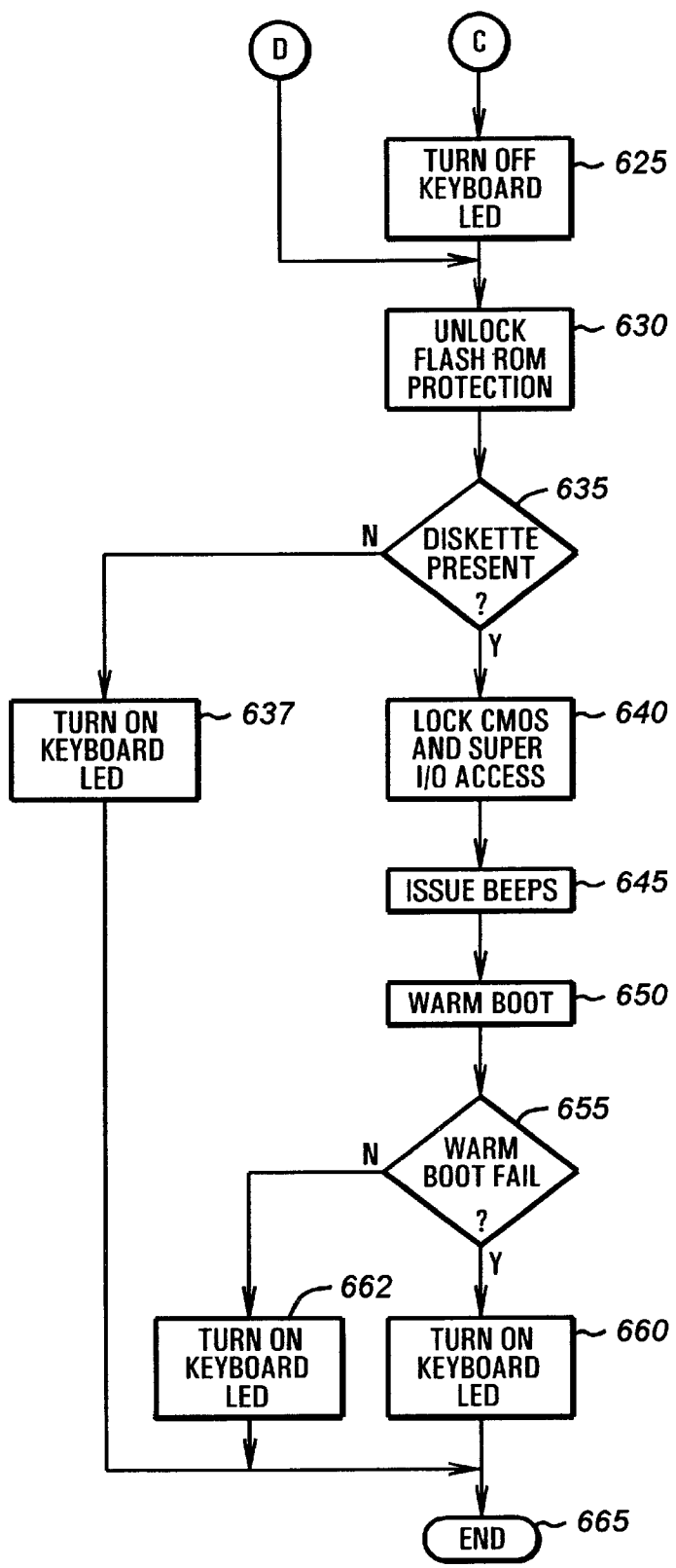

Turning to FIG. 1, illustrated is a typical computer system S implemented according to the invention. While this system is illustrative of one embodiment, the techniques according to the invention can be implemented in a wide variety of systems. The computer system S in the illustrated embodiment is a PCI bus/ISA bus based machine, having a peripheral component interconnect (PCI) bus 10 and an industry standard architecture (ISA) bus 12. The PCI bus 10 is controlled by PCI controller circuitry located within a memory/accelerated graphics port (AGP)/PCI controller 14. This controller 14 (the "host bridge") couples the PCI bus 10 to a processor socket 16 via a host bus, an AGP connector 18, a memory subsystem 20, and an AGP 22. A second bridge circuit, a PCI/ISA bridge 24 (the "ISA bridge") bridges between the PCI bus 10 and the ISA bus 12. The host bridge 14 in the disclosed embodiment is a 440LX Integrated Circuit by Intel Corporation, also known as the PCI AGP Controller (PAC). The ISA bridge 24 is a PIIX4, also by Intel Corporation. The host bridge 14 and ISA bridge 24 provide capabilities other than bridging between the processor socket 16 and the PCI bus 10, and the PCI bus 10 and the ISA bus 12. Specifically, the disclosed host bridge 14 includes interface circuitry for the AGP connector 18, the memory subsystem 20, and the AGP 22. The ISA bridge 24 further includes an internal enhanced IDE controller for controlling up to four enhanced IDE drives 26, and a universal serial bus (USB) controller for controlling USB ports 28.

The host bridge 14 is preferably coupled to the processor socket 16, which is preferably designed to receive a Pentium II processor module 30, which in turn includes a microprocessor core 32 and a level two (L2) cache 34. The processor socket 16 could be replaced with different processors other than the Pentium II without detracting from the spirit of the invention.

The host bridge 14, when the Intel 440LX Host Bridge is employed, supports extended data out (EDO) dynamic random access memory (DRAM) and synchronous DRAM (SDRAM), a 64/72-bit data path memory, a maximum memory capacity of one gigabyte, dual inline memory module (DIMM) presence detect, eight row address strobe (RAS) lines, error correcting code (ECC) with single and multiple bit error detection, read-around-write with host for PCI reads, and 3.3 volt DRAMs. The host bridge 14 support up to 66 megahertz DRAMs, whereas the processor socket 16 can support various integral and nonintegral multiples of that speed.

The ISA bridge 24 also includes enhanced power management. It supports a PCI bus at 30 or 33 megahertz and an ISA bus 12 at ¼ of the PCI bus frequency. PCI revision 2.1 is supported with both positive and subtractive decode. The standard personal computer input/output (I/O) functions are supported, including a direct memory access (DMA) controller, two 82C59 interrupt controllers, an 8254 timer, a real time clock (RTC) with a 256 byte complementary metal oxide semiconductor (CMOS) static RAM (SRAM), and chip selects for system Read Only Memory (ROM), RTC, keyboard controller, an external microcontroller, and two general purpose devices. The enhanced power management within the ISA bridge 24 includes full clock control, device management, suspend and resume logic, advanced configuration and power interface (ACPI), and system management bus (SMBus) control, which implement the inter-integrated circuit ($I^2C$) protocol.

The PCI bus 10 couples a variety of devices that generally take advantage of a high speed data path. This includes a small computer system interface (SCSI) controller 26, with both an internal port 38 and an external port 40. In the disclosed embodiment, the SCSI controller 26 is a AIC-7860 SCSI controller. Also coupled to the PCI bus 10 is a network interface controller (NIC) 42, which preferably supports the ThunderLan™ power management specification by Texas Instruments. The NIC 42 is coupled through a physical layer 44 and a filter 46 to an RJ-45 jack 48, and through a filter 50 to a AUI jack 52.

Between the PCI Bus 10 and the ISA Bus 12, an ISA/PCI backplane 54 is provided which include a number of PCI and ISA slots. This allows ISA cards or PCI cards to be installed into the system for added functionality.

Further coupled to the ISA Bus 12 is an enhanced sound system chip (ESS) 56, which provides sound management through an audio in port 58 and an audio out port 60. The ISA bus 12 also couples the ISA bridge 24 to a Super I/O chip 62, which in the disclosed embodiment is a National Semiconductor Corporation PC87307VUL device. The Super I/O 62 contains several logical devices, one of which is a Real Time Clock (RTC). Resident in the RTC of the Super I/O chip 62 is non-volatile Random Access Memory (NV RAM) 63. This Super I/O chip 62 provides a variety of input/output functionality, including a parallel port 64, an infrared port 66, a keyboard controller for a keyboard 68, a mouse port for a mouse 70, additional series ports 72, and a floppy disk drive controller for a floppy disk drive 74. These devices are coupled through connectors to the Super I/O 62.

Resident on the keyboard 68 are light emitting diodes (LEDs) 69. The floppy disk drive 74 includes disk drives for a 3½" and 5¼" floppy disks, and includes Advanced Technology Attachment Packet Interface (ATAPI) drives.

The ISA bus 12 is also coupled through bus transceivers 76 to a flash ROM 78, which can include both basic input/output system (BIOS) code for execution by the processor 32, as well as an additional code for execution by microcontrollers in a ROM-sharing arrangement.

The ISA bus 12 further couples the ISA bridge 24 to a security, power, ACPI, and miscellaneous application specific integrated circuit (ASIC) 80, which provides a variety of miscellaneous functions for the system. The ASIC 80 includes security features, system power control, light emitting diode (LED) control, a PCI arbiter, remote wake up logic, system fan control, hood lock control, ACPI registers and support, system temperature control, and various glue logic.

Finally, a video display 82 can be coupled to the AGP connector 18 for display of data by the computer system S.

Again, a wide variety of systems could be used instead of the disclosed system S without detracting from the spirit of the invention.

Turning now to FIG. 2, a sector partitioning structure 200 of the flash ROM 78 in the disclosed embodiment is shown. However, while this diagram is illustrative of one embodiment, the techniques according to the invention can be implemented in a variety of embodiments and can be implemented with a variety of non-volatile memory. The sector partitioning structure 200 is determined by the sector architecture of the particular flash ROM 78. The flash ROM 78 used in the disclosed embodiment is an Advanced Micro Devices (AMD) AM29F002 flash ROM memory. The sector partitioning structure 200 shows a top boot block design architecture. The AMD AM29F002 flash ROM memory can also be implemented with a bottom boot block design architecture.

A boot block sector 202 consists of a first boot block sector 204 of 16 kilobytes and a second boot block sector 206 of 8 kilobytes. The remaining 232 kilobytes form a system block 208 divided into 5 sectors 210–218. In the disclosed embodiment, the first sector 210 has 8 kilobytes, the second sector 212 has 32 kilobytes, and the remaining three sectors 214, 216, and 218 have 64 kilobytes equally. The code stored in the system block 208 preferably contains the Basic Input/Output System (BIOS) code. The BIOS is code interfacing between the operating system and the specific hardware configuration, allowing the same operating system to be used with different hardware configurations. The boot block 202 contains the code necessary to initialize the systems when an anomaly during power-up is detected or when designated by the user. During a boot block 202 initialization, preferably a reduced set of hardware is initialized, thus reducing the size of the code in the boot block 202. The boot block 202 code typically contains an initialization procedure for only the hardware necessary to perform limited functions. Typically a limited function necessary to be performed during boot block 202 initialization is the flash of the ROM 78. The boot block 202 contains code initializing the hardware components necessary to flash the ROM 78 and to prompt the user for an administrative password. The boot block 202 code is contained within the boot block 202, which is protected from spurious initialization. The system block 208 is electronically protected, but the system S is at least physically capable of disabling that protection and overwriting the system block 208. During a flash, the system block 208 sectors is rewritten with a new flash ROM image.

Turning now to FIG. 3, illustrated is a standard keyboard 68 with LEDs 69. The keys of the keyboard 68 include function keys 302, a numeric keypad 304, scroll keys 306, QWERTY keys 308, and an escape key 310.

The function keys 302 include 12 keys, designated F1–F12, located along the top of keyboard 68. The numeric keypad 304 is located on the right side of the keyboard. The numeric keypad is configured to resemble a standard adding machine format. The scroll keys 306 are located between the numeric keypad 304 and the QWERTY keys 308. The scroll keys allow the user to move a cursor, displayed on the video display 82 of FIG. 1, throughout a document or program.

The QWERTY keys 308 occupy the left and center of the keyboard 68. The QWERTY keys resemble the standard layout of a typewriter. The QWERTY keys include the letters of the alphabet, digits 0–9, and standard documentation characters. The escape key 310 is located in the top left corner of the keyboard 68. The escape key 310 and function keys 302 can be used to communicate a variety of information to the computer system S, depending on the program currently being executed by the computer system S.

During initial power-up (not a warm boot) the computer system S according to the invention can be forced into booting from the boot block 202 code by pressing and holding down the escape key 310 prior to power-up and during the initialization period. If the escape key 310 is detected, the processor 32 will execute the boot block 202 code and proceed as if a corrupted ROM is detected. The boot block 202 procedure is discussed in copending application "A COMPUTER METHOD AND APPARATUS TO PROMPT FOR ADMINISTRATIVE PASSWORD TO FLASH A CORRUPTED NON-VOLATILE MEMORY," incorporated by reference above. While pressing the escape key 310 is illustrative of the disclosed embodiment, the techniques according to the invention could be implemented by a wide variety of inputs, including but not limited to other keys or a mouse 70.

Turning to FIGS. 4A–D, illustrated is a flow chart of the boot block 202 code contained in the flash ROM 78. A start routine 500 consists of the power-up procedure of the system. The processor 32 first proceeds to the built-in self test (BIST) at step 505. After obtaining the BIST status at step 505, the processor 32 then proceeds to initialize host and ISA bridges at step 510. The processor 32 then initializes the Super I/O 62 at step 515 and then performs an 8042 initialization and self test at step 520. The 8042 self test consists of doing a self test on the keyboard 68 and a keyboard controller contained in the Super I/O 62. The processor 32 then determines whether the escape key 310 has been pressed during power-up at step 525. This determination is completed within 500 milliseconds after the keyboard 68 is initialized. This time frame allows for the keyboard 68 to complete reset and register that the escape key 310 is pressed. If so, then the processor 32 proceeds to step 540 and issues error beeps. By pressing the escape key 310 during power-up, the computer system S is forced into executing the boot block code even though the computer system S determines the ROM is not corrupted. If the escape key 310 was not pressed at step 525 during power-up, then the processor 32 verifies the ROM 78 image at step 530. When the processor 32 verifies the ROM 78 image, the processor 32 determines whether the ROM 78 has become corrupt at step 535. If not, then the processor 32 proceeds to step 536, and executes the system block 208 code. However, if the ROM 78 image is corrupt, then the processor 32 continues to execute the boot block 202 code by proceeding to step 540 in FIG. 4B.

The processor 32 causes error beeps at step 540 and then flashes the keyboard 68 LEDs 69 at step 545 via an 8042 keyboard controller in the Super I/O 62. Then the processor 32 initializes the 8259s interrupt controllers in step 550. The processor 32 then powers up a real time clock (RTC) in step 555 and sets up a memory map and programs the ISA bridge 12 in step 560. The processor 32 then clears the Extended BIOS Data Area (EBDA) and base memory at step 565 before initializing the real time clock (RTC) and direct memory access (DMA) controller at step 570. The processor 32 then unmasks supported interrupt requests (IRQs) at step 575. Proceeding to FIG. 4C, the processor 32 initializes the floppy controller at step 580, initializes the IDE controller at step 585, and installs the Advanced Technology Attachment Packet Interface (ATAPI) support in step 590. These devices are necessary if used to flash the ROM 78 image. ATAPI support is described in copending application "BOOT BLOCK SUPPORT FOR ATAPI REMOVABLE MEDIA DEVICES," previously incorporated by reference. Next, the processor 32 determines if the administrative password is present in the security device 80 at step 595. If no administrative password is present, then the processor 32 proceeds to step 630 (FIG. 4D), and unlocks the flash ROM protection. If the administrative password is present in the security device 80, then the processor 32 instead proceeds from step 595 to turn on the keyboard 68 LEDs 69 in step 600 in accordance with the exemplary predefined prompt set shown in FIG. 5. Next the processor 32 reads any keystrokes entered via the keyboard 68 at step 605. If no keystrokes have been entered via the keyboard 68, the processor 32 continues to monitor for key strokes at step 610. After a return key has been encountered, the processor 32 proceeds to step 615 to read the administrative password from the security device 80. The administrative password is then compared to the keystrokes entered at step 620. If they are not equal, the processor 32 returns to step 605 to monitor keystrokes and again waits for a proper keystrokes to be entered. If the keystrokes do equal the administrative password, the processor 32 turns off the keyboard 68 LEDs 69 at step 625 in FIG. 4D.

The processor 32 then unlocks the flash ROM 78 protection at step 630 and determines if a diskette is present in the floppy drive 74 at step 635. If no diskette is present, the processor 32 then turns on the keyboard 68 LEDs 69, in accordance with the exemplary predefined prompt set, in step 637 before ending the procedure in step 665. The system must be reset to retry ROM flash. If a diskette is present, the processor locks the CMOS and Super I/O access at step 640. The processor 32 then issues audio beeps at step 645 and then performs a boot of the system at step 650. The boot is performed by issuing an INT 19 software interrupt. The boot is performed by the initialized floppy drive, ATAPI drive, or over the parallel or serial ports. If the boot fails, then the processor 32 turns on the keyboard 68 LEDs 69, in accordance with the exemplary predefined prompt set, at step 660 to alert the user. If the boot does not fail, the processor 32 turns on the keyboard 68 LEDs 69, in accordance with the exemplary predefined prompt set, at step 662 and continues to step 665, where the routine is complete. The flow chart diagram ends 665.

Turning now to FIG. 5, illustrated is a table 400 of a predefined prompt set for the keyboard 68 LEDs 69 of the disclosed embodiment. While this table 400 is illustrative of one embodiment, the techniques according to the invention could be implemented in a wide variety of predetermined prompt sets. The table 400 consists of 4 sets of prompts. A first prompt 402 consists of the capslock LED "On," the numlock LED "Off," and the scrolllock LED "Off." When this predetermined set is displayed the computer system S is awaiting for the administrative password to be entered. This system S remains in this state until a valid administrative password has been entered. A second prompt 404 consists of the capslock LED "Off," the numlock LED "On," and the scrolllock LED "Off." When this predetermined set is displayed, the system S is conveying that the boot has failed and that the system S must be reset to retry the boot. To retry the boot, the system S must be powered down, then powered up again. A third prompt 406 consists of capslock LED "Off," numlock LED "Off," and the scrolllock LED "On." When this predetermined set is displayed, the system S is conveying that the flash has failed and that the boot process must be initiated again. A fourth prompt 408 consists of capslock LED "On," numlock LED "On," and the scrolllock LED "On." When this predetermined set is displayed, the flash has completed and no error has been detected during the flash process.

The foregoing disclosure and description of the invention are illustrative and explanatory thereof, and various changes in the size, shape, materials, components, circuit elements, wiring connections and contacts, as well as in the details of the illustrated circuitry and construction and method of operation may be made without departing from the spirit of the invention.

What is claimed is:

1. A method to force a computer system into a boot block recovery to flash an image into a non-volatile memory, the method comprising the steps of:

providing a non-volatile memory with a boot block and a system block, wherein the boot block is generally read only and the system block is generally writable; and executing a system start-up routine in the boot block, the start-up routine comprising the steps of:

checking for a predetermined user input on system start-up; and if the predetermined user input is detected, forcing execution of boot block recovery code in the boot block, else booting from the system block.

2. The method of claim 1, wherein the non-volatile memory is a flash Read Only Memory (ROM).

3. The method of claim 1, wherein the non-volatile memory is a programmable ROM.

4. The method of claim 1, further comprising the steps of:

after the step of checking for a predetermined user input on system start-up, if no predetermined user input has been entered, performing the steps of:

determining if the non-volatile memory has become corrupt; and responsive to determining the non-volatile memory has become corrupt, forcing execution of boot block recovery code in the boot block.

5. The method of claim 1, wherein the step of checking for a predetermined user input comprises the step of checking for a predetermined keypress on a keyboard.

6. The method of claim 5, wherein the predetermined keypress is an escape key keypress.

7. The method of claim 1, wherein the step of checking for a predetermined user input comprises the step of checking for a predetermined mouse stroke on a mouse.

8. The method of claim 1, wherein the step of forcing execution of the boot block recovery code comprises the steps of:

loading a minimal system via a boot using boot block code; and reprogramming the non-volatile memory using the minimal system.

9. A system to force a computer system into a boot block recovery to flash an image for use with a processor, the system comprising:

a non-volatile memory;

a system block residing in the non-volatile memory, the system block being generally writable;

a boot block residing in the non-volatile memory the boot block generally read only; and boot block code stored in the boot block, the boot block code, when executed, causing the processor to perform the step of:

executing a system start-up routine in the boot block, the start-up routine comprising the steps:

checking for a predetermined user input on system start-up; and if the predetermined user input is detected, forcing execution of boot block recovery code in the boot block, else booting from the system block.

10. The system of claim 9, wherein the non-volatile memory is a flash Read Only Memory (ROM).

11. The system of claim 9, wherein the non-volatile memory is a programmable ROM.

12. The system of claim 9, wherein the boot block cannot be flashed.

13. The system of claim 9, wherein the boot block code, when executed, further causes the processor to perform the steps of:

after the step of checking for a predetermined user input on system start-up, if no predetermined user input has been entered, performing the steps of:

determining if the non-volatile memory has become corrupt; and responsive to determining the non-volatile memory has become corrupt, forcing execution of boot block recovery code in the boot block.

14. The system of claim 9, wherein the boot block code for performing the step of checking for a predetermined user input comprises code for performing the step of checking for a predetermined keypress on a keyboard.

15. The system of claim 14, wherein the predetermined keypress is an escape key keypress.

16. The system of claim 9, wherein the boot block code for performing the step of checking for a predetermined user input comprises code for performing the step of checking for a predetermined mouse stroke on a mouse.

17. The system of claim 9, wherein the boot block code, when executed, further causes the processor to perform the step of forcing execution of the boot block recovery code comprises the steps of:

loading a minimal system in a boot using boot block code; and reprogramming the non-volatile memory using the minimal system.

18. A computer system that enters into a boot block recovery to flash an image, the computer system comprising:

a processor;

a non-volatile memory coupled to the processor;

a user input device coupled to the processor for receiving an input;

a system block residing in the non-volatile memory, the system block being generally writable;

a boot block residing in the non-volatile memory the boot block being generally read only; and boot block code stored in the boot block, the boot block code, when executed, causing the processor to perform the step of:

executing a system start-up routine in the boot block, the start-up routine comprising the steps of:

checking for a predetermined user input on system start-up; and if the predetermined user input is detected, forcing execution of boot block recovery code in the boot block, else booting from the system block.

19. The computer system of claim 18, wherein the non-volatile memory is a flash Read Only Memory (ROM).

20. The computer system of claim 18, wherein the non-volatile memory is a programmable ROM.

21. The computer system of claim 18, wherein the boot block cannot be flashed.

22. The computer system of claim 18, further comprising the steps of:

after the step of checking for a predetermined user input on system start-up, if no predetermined user input has been entered, performing the steps of:

determining if the non-volatile memory has become corrupt; and responsive to determining the non-volatile memory has become corrupt, forcing execution of boot block recovery code in the boot block.

23. The computer system of claim 18, wherein the boot block code for performing the step of checking for a predetermined user input comprises code for performing the step of checking for a predetermined keypress on a keyboard.

24. The computer system of claim 23, wherein the predetermined keypress is an escape key keypress.

25. The computer system of claim 18, wherein the boot block code for performing the step of checking for a predetermined user input comprises code for performing the step of checking for a predetermined mouse stroke on a mouse.

26. The computer system of claim 18, wherein the boot block code, when executed, further causes the processor to perform the step of forcing execution of the boot block recovery code comprises the steps of:

loading a minimal system in a boot using boot block code; and reprogramming the non-volatile memory using the minimal system.

27. The computer system of claim 18, wherein the input device is a keyboard.

28. The computer system of claim 27, wherein the input device is an escape key on the keyboard.

29. The computer system of claim 18, wherein the input device is a mouse.

30. A method to rewrite the boot code of a computing system, the method comprising the steps of:

providing a non-volatile memory with a read-only boot block containing a set of hardware initialization procedures directed to a flash of a non-volatile memory and containing a writable system block containing boot-up procedures;

checking for a predetermined user input that is of a predetermined duration during a computer power-up; and if the predetermined user input of the predetermined duration is detected, executing a flash procedure, comprising the steps of:

executing the hardware initialization procedures in the boot block to flash the system block of the non-volatile memory; and executing the boot-up procedures, which may or may not have been modified by the flash procedure, in the system block.

31. The method of claim 30, wherein the non-volatile memory is a flash Read Only Memory (ROM).

32. The method of claim 30, further comprising the step of:

if the predetermined user input of the predetermined duration is not detected, executing the boot-up procedures in the system block.

33. The method of claim 30, wherein the checking for a predetermined user input step is performed after a keyboard is initialized and before the boot-up procedure is complete.

* * * * *